US011693917B2

(12) United States Patent
Caglar

(10) Patent No.: US 11,693,917 B2
(45) Date of Patent: Jul. 4, 2023

(54) COMPUTATIONAL MODEL OPTIMIZATIONS

(71) Applicant: State Street Corporation, Boston, MA (US)

(72) Inventor: Mehmet Umut Caglar, Boston, MA (US)

(73) Assignee: State Street Corporation, Boston, MA (US)

( * ) Notice: Subject to any disclaimer, the term of this patent is extended or adjusted under 35 U.S.C. 154(b) by 0 days.

(21) Appl. No.: 17/562,481

(22) Filed: Dec. 27, 2021

(65) Prior Publication Data

US 2022/0121729 A1    Apr. 21, 2022

Related U.S. Application Data

(63) Continuation of application No. 16/436,530, filed on Jun. 10, 2019, now Pat. No. 11,210,368.

(51) Int. Cl.
*G06F 9/44* (2018.01)
*G06F 17/18* (2006.01)
*G06N 20/00* (2019.01)

(52) U.S. Cl.
CPC ............ *G06F 17/18* (2013.01); *G06N 20/00* (2019.01)

(58) Field of Classification Search
CPC ...................................................... G06F 17/18
USPC ............................................................. 703/2
See application file for complete search history.

(56) References Cited

U.S. PATENT DOCUMENTS

| 2015/0120254 | A1* | 4/2015 | Muraoka | ............ G06F 30/00 703/2 |
| 2018/0240041 | A1* | 8/2018 | Koch | ............ G06F 16/24578 |
| 2018/0336493 | A1* | 11/2018 | Hayes | ............ G06N 20/00 |
| 2019/0102693 | A1* | 4/2019 | Yates | ............ G06N 5/003 |

* cited by examiner

*Primary Examiner* — Timothy A Mudrick
(74) *Attorney, Agent, or Firm* — Goodwin Procter LLP

(57) ABSTRACT

Systems, methods, apparatuses, and computer-readable media for computational model optimization. A plurality of sampled values for a hyperparameter of a computational model may be received, the plurality of sampled values comprising a subset of a plurality of possible values for the hyperparameter, each sampled value associated with a performance metric for the computational model with the sampled value assigned to the hyperparameter. A first candidate value from the plurality of possible values may be determined, the first candidate value having a distance to a first sampled value of the plurality of sampled values that exceeds a threshold distance, wherein the distance is in a space comprising the plurality of possible values. The first candidate value may be assigned to the hyperparameter of the computational model. A first performance metric may be determined for the computational model with the first candidate value assigned to the hyperparameter.

17 Claims, 15 Drawing Sheets

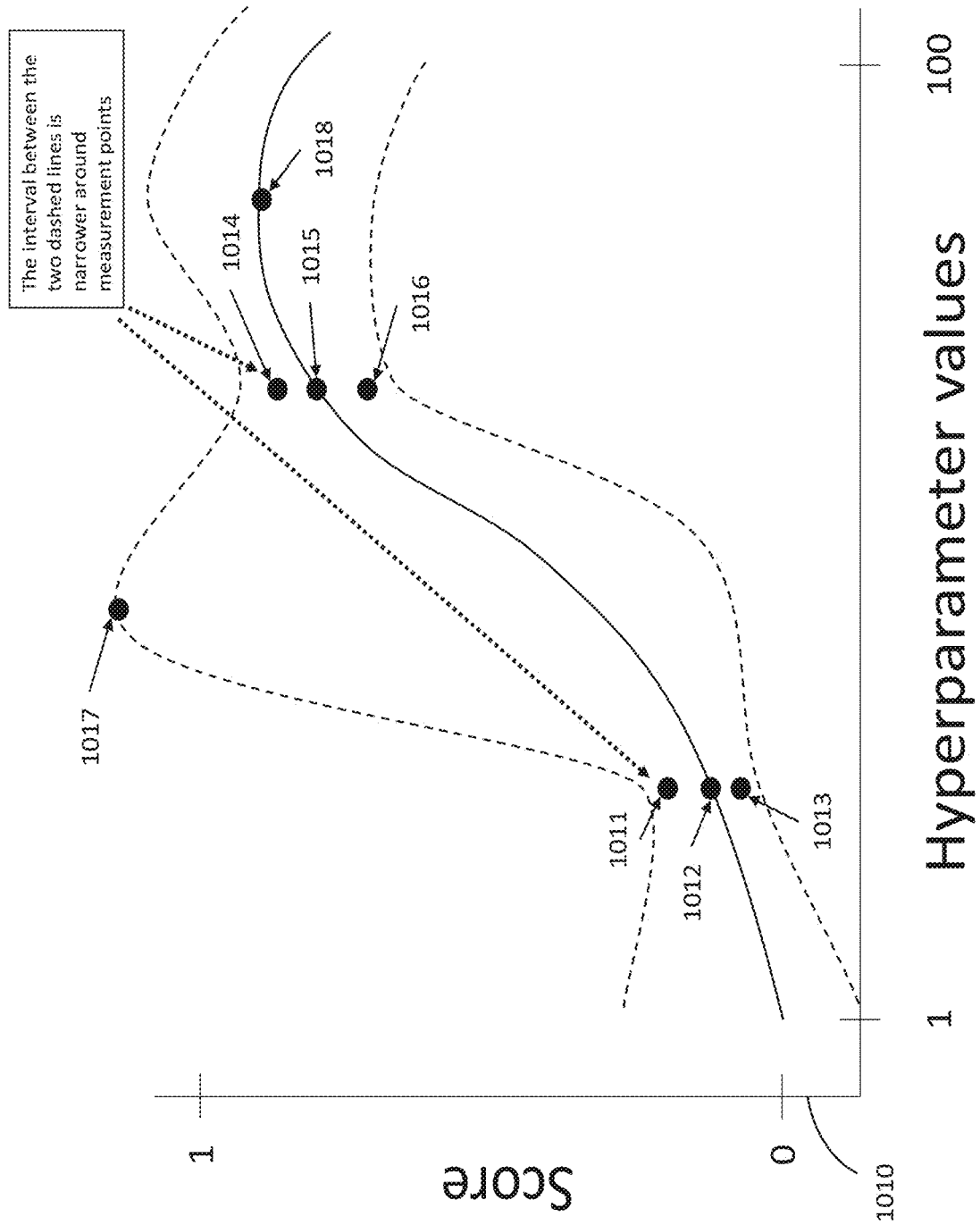

COMPUTATIONAL MODEL OPTIMIZATIONS

CROSS-REFERENCE TO RELATED APPLICATION

This application is a continuation of, and claims the benefit of priority under 35 U.S.C. § 120 to, U.S. patent application Ser. No. 16/436,530 filed Jun. 10, 2019, and entitled "Computational Model Optimizations", which is incorporated herein by reference in its entirety for all purposes.

TECHNICAL FIELD

Embodiments disclosed herein relate to the field of computational models. More specifically, embodiments disclosed herein relate to optimizing hyperparameters of computational models.

BACKGROUND

Computational models may have hyperparameters with values that are defined before training of the computational models is performed. Conventionally, defining hyperparameter values is largely a manual process. Some approaches may include using inefficient brute force search algorithms to identify hyperparameter values that cause the computational models to operate more efficiently. Furthermore, a computational model may have a large number of hyperparameters, making conventional approaches to identify optimal values for each hyperparameter infeasible due to the required time and computation.

SUMMARY

In one embodiment, a plurality of sampled values for a hyperparameter of a computational model may be received, the plurality of sampled values comprising a subset of a plurality of possible values for the hyperparameter, each sampled value associated with a performance metric for the computational model with the sampled value assigned to the hyperparameter. A first candidate value from the plurality of possible values may be determined, the first candidate value having a distance to a first sampled value of the plurality of sampled values that exceeds a threshold distance, wherein the distance is in a space comprising the plurality of possible values. The first candidate value may be assigned to the hyperparameter of the computational model. A first performance metric may be determined for the computational model with the first candidate value assigned to the hyperparameter.

BRIEF DESCRIPTION OF THE DRAWINGS

FIGS. 10A-10B illustrate examples of hyperparameter optimization.

DETAILED DESCRIPTION

Figure 1:
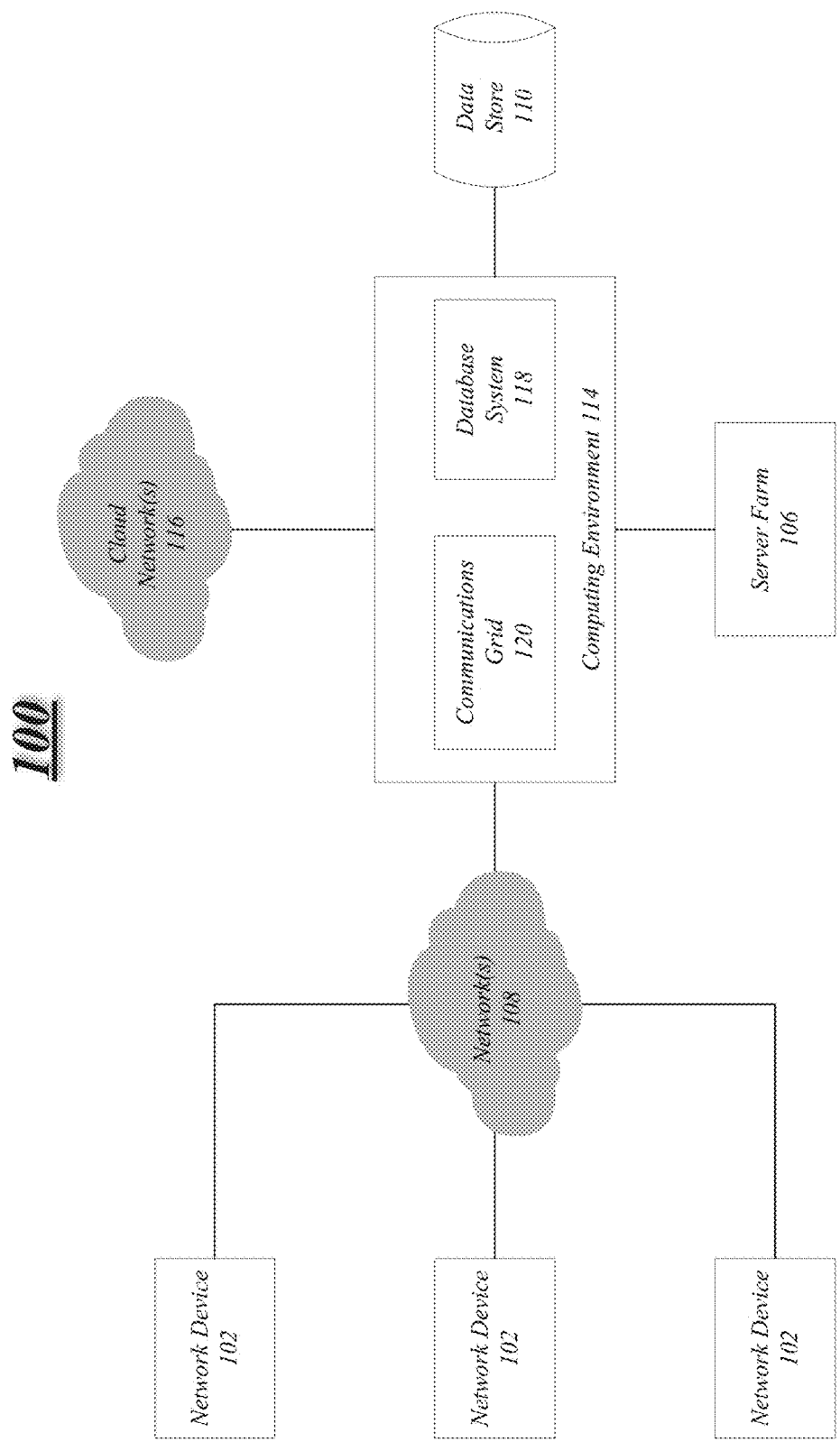
FIG. 1 depicts hardware components of a data transmission network.

Embodiments disclosed herein provide techniques to optimize hyperparameter values for computational models. Generally, a hyperparameter may have a plurality of different possible values in a data space (e.g., integer values from 0-999) for the hyperparameter. Embodiments disclosed herein may generally leverage one or more previously sampled possible values to determine (or predict) which values to sample next for the hyperparameter. For example, in one embodiment, a possible value may be selected from a region of the data space that has not been previously sampled (and/or includes a number of sampled values that is below a threshold value). As another example, in one embodiment, a possible value may be selected based on the value being greater than a threshold distance in the data space from the previously sampled values. In some embodiments, the search space may be extended, such as by expanding the integer space from 0-999 to 0-1100. Regardless of the particular optimization technique used, embodiments disclosed herein may then train the computational model (with the selected hyperparameter values) on a training dataset and validate the performance of the model using a validation dataset. Doing so may produce one or more values indicating an accuracy of the model using the selected hyperparameter values, performance values of the computational model using the selected hyperparameter values (e.g., time, computing resources used, etc.), and/or an overall score of the computational model using the selected hyperparameter values. Doing so allows the best performing hyperparameter value combinations to be programmatically identified for use in the computational model, thereby improving the accuracy and performance of the computational model and improving the performance of any systems executing the computational model. Furthermore, by applying heuristics and/or parallel processing to programmatically identify optimal hyperparameter values using less time and/or computing resources, embodiments disclosed herein provide improvements over conventional approaches to optimizing hyperparameter values.

Furthermore, embodiments disclosed herein may leverage parallelism to improve the overall performance of hyperparameter optimization. For example, a search history file may specify information for each possible value in the space, including which values have been previously sampled, and the performance (e.g., accuracy, performance values) of the computational model using the sampled values. A plurality of parallel worker threads may select hyperparameter values from the space, configure the computational model using the selected hyperparameter values, train the computational model using training data, and validate the model using the validation data. Doing so may produce one or more values reflecting the accuracy and/or performance of the computational model using the selected hyperparameter values. The worker threads may then update the file with the values reflecting the accuracy and/or performance of the computational model using the selected hyperparameter values.

In some embodiments, a computational model may include various information processing models, including, without limitation, artificial intelligence models, machine learning models, cognitive computational models, pattern recognition models, deep learning models, analytical models, language analysis models, image analysis models, and/or the like. The computational models may be trained to perform various functions.

Illustrative and non-limiting examples of functions performed by the computational models may include predictive classification, signature analysis, signature authentication, document analysis, document classification, document authentication, anomaly detection, fraud detection, financial products and services analysis, risk management, due diligence, investment research, document conversion, and/or the like. For example, some embodiments may provide a signature analysis transformation operative to learn and verify signatures included on documents. In another example, some embodiments may provide an anomaly detection transformation operative to learn "normal" activity for a process (e.g., credit card transactions) based on received training data and to transform "real-world" data into a probability value indicating anomalous activity (e.g., probability that a credit card transaction is fraudulent). Embodiments are not limited in this context.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that are capable of communicating with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

In other embodiments, network devices may provide a large amount of data, either all at once or streaming over a period of time to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the interne of things (IoT), such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
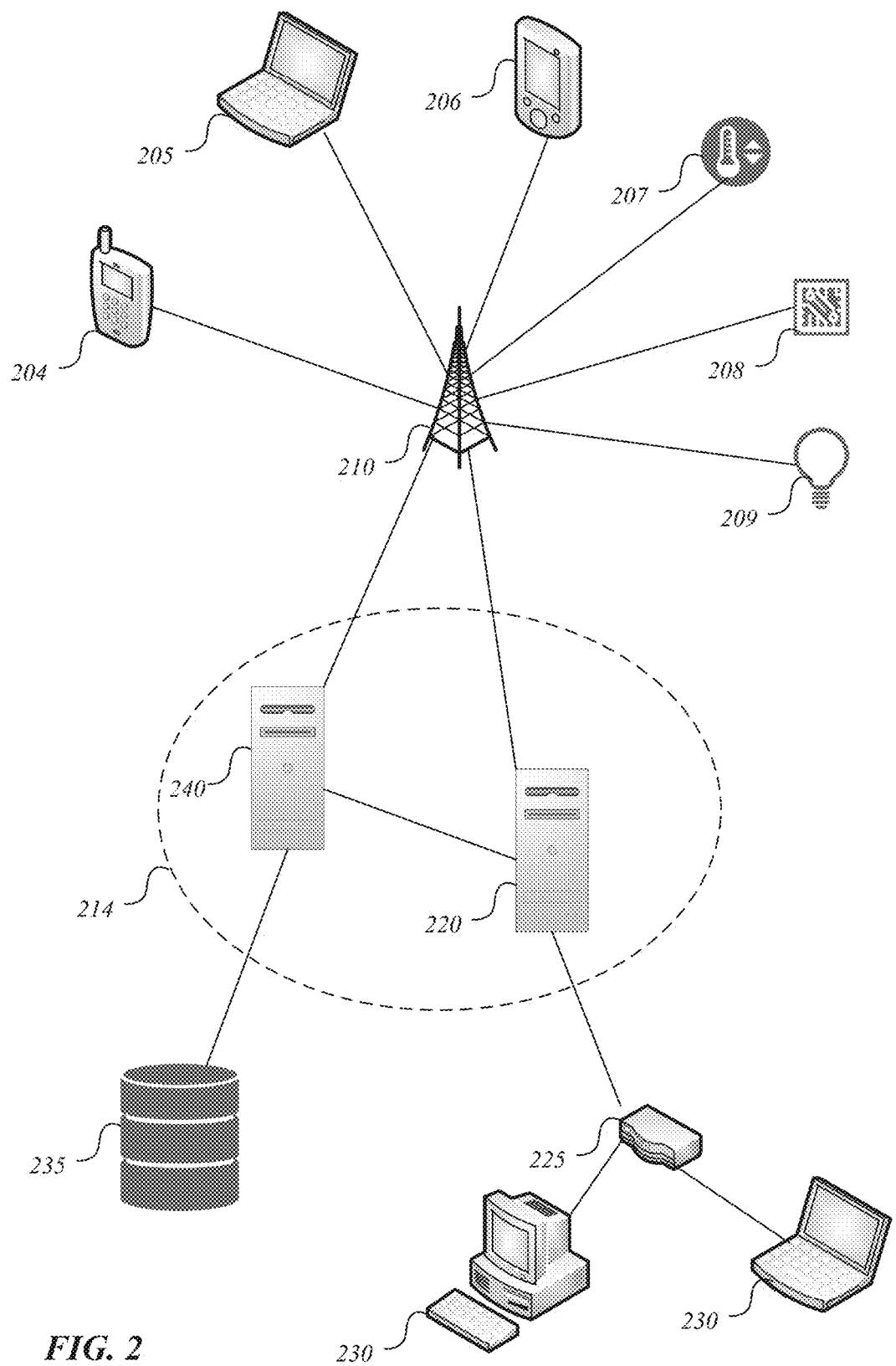
FIG. 2 depicts an example network including an example set of devices communicating with each other over an exchange system.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., a financial operation). The network devices may detect and record data related to the environment that it monitors and transmit that data to computing environment 214.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 202 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 214, or before deciding whether to transmit data to the computing environment 214. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240, such as a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
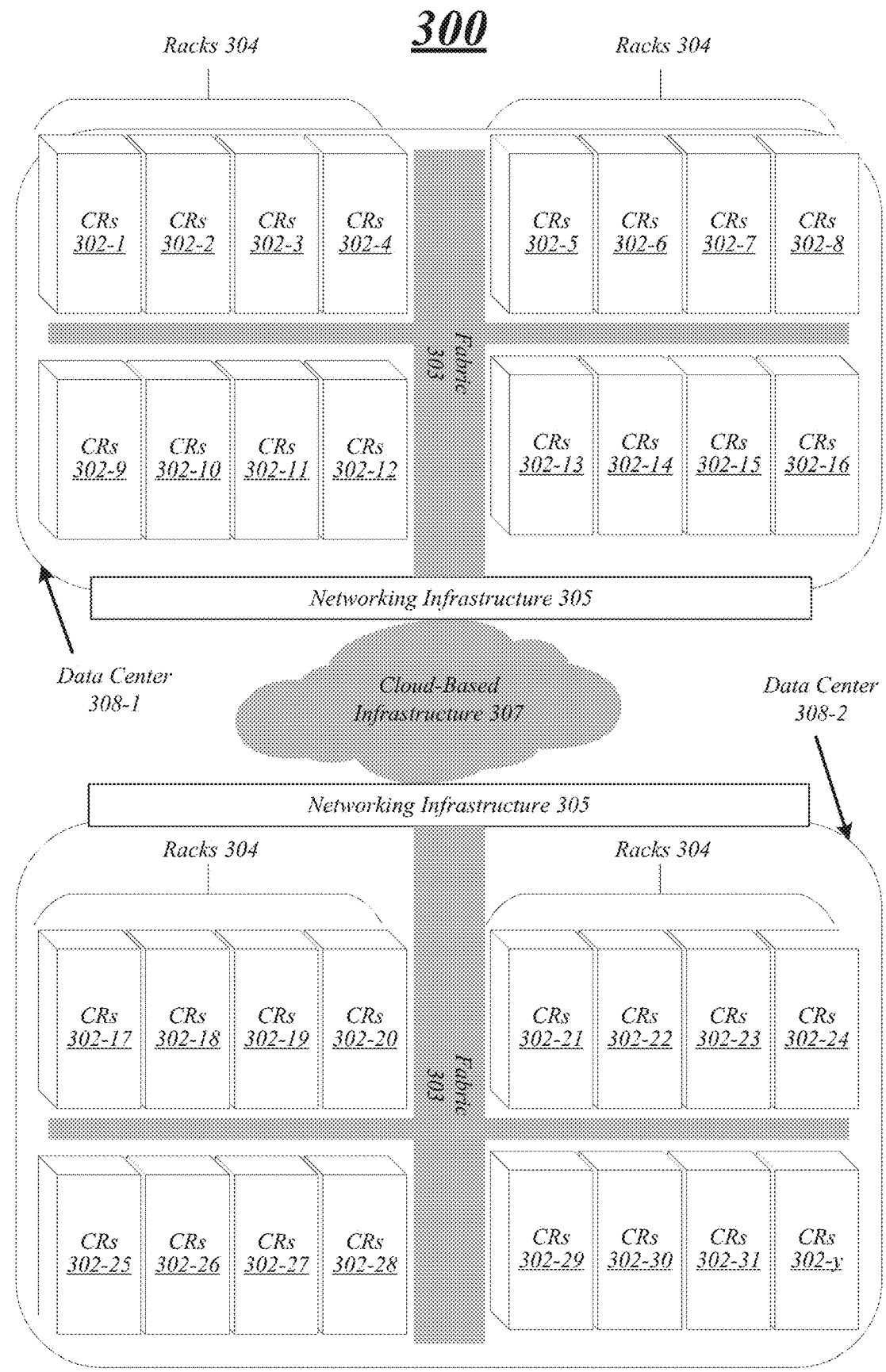
FIG. 3 illustrates an embodiment of an example system.

FIG. 3 illustrates a conceptual overview of a system 300 that may generally be representative of a distributed cloud-based computing system or another type of computing network in that one or more techniques described herein may be implemented according to various embodiments. As shown in FIG. 3, system 300 may generally include computing resources (CRs) 302-y, where y may be any positive integer, to compute information and data. The computing resources 302 may include resources of multiple types, such as—for example—processors, co-processors, fully-programmable gate arrays (FPGAs), memory, networking equipment, circuit boards, storage, and other computing equipment. The embodiments are not limited to these examples.

The computing resources 302 may be included as part of a computer, such as a server, server farm, blade server, a server sled, or any other type of server or computing device, and may be within one or more racks 304. In embodiments, the racks 304 may be part of one or more data centers 308 and may be coupled with each other via various networking equipment. For example, the racks 304 within a data center 308 may be coupled with each via a fabric 303. The fabric 303 may include a combination of electrical and/or optical signaling media, and high bandwidth interconnects, such as Gigabit Ethernet, 10 Gigabit Ethernet, 100 Gigabit Ethernet, InfiniBand, Peripheral Component Interconnect (PCI) Express (PCIe), and so forth. Further, the fabric 303 may include switching infrastructure, such as switches, routers, gateways, and so forth. The fabric 303 is configured such that any rack 304 may send signals to (and receive signals from) each other racks 304 within a data center 308 to communicate data and information. In embodiments, the fabric 303 may be coupled with networking infrastructure 305 such that it enables communication of signals between racks of one data center 308 with racks 304 of another data center 308 to communicate data and information. For example, FIG. 3 illustrates racks 304 of data center 308-1 coupled with racks 304 of data center 308-2 via fabrics 303, networking infrastructure 305, and the cloud-based infrastructure 307.

In embodiments, the networking infrastructure 305 includes networking equipment, such as routers, firewalls, switches, gateways, cabling, and so forth to communicate data and information between a data center 308 and with the cloud-based infrastructure 307 and another data center 308. For example, the networking infrastructure 305 may include edge access routers, edge access switches, and edge firewalls capable of communicating with core routers, core switches, and core firewalls of the cloud-based infrastructure 307. The core networking equipment of the cloud-based infrastructure 307 may couple with edge networking equipment of another data center 308 to enable communication between data centers 308. Note that embodiments are not limited in this manner, and the networking infrastructure 305 and/or cloud-based infrastructure 307 may include other networking equipment, servers, relays, interconnects, and so forth to enable communication between a data center 308 and other data centers 308.

In one example, the system 300 may be a distributed cloud-based computing system to provide a financial service platform. The system 300 may process data and information, such as financial data and financial information, to provide financial services, for example. The financial services include, but are not limited to, investment and asset management services, active equity management services, active quantitative equity services, cash fund services, alternatives services, currency management services, index investing services, electronic trading services, multi-asset services, investment research services, investment trading services, accounting services, custody services, fund administration services, outsourcing services, performance measurement services, portfolio analysis services, data analytics services, investment analytics services, benchmark/indices/indicator services, D-as-a-Service (DaaS) services, and so forth. Embodiments are not limited to these examples. To provide these financial services, the system 300 may dynamically pool or compose a plurality of the computing resources 302 together within a data center 308 and/or among data centers 308 in the cloud via the cloud-based infrastructure 307. In one example, computing resources 302 of data center 308-1 may be composed with computing resources 302 of data center 308-2 to process data and information, e.g., a job, to provide a financial service. Once the job complete, the system 300 may decompose the composed computing resources 302 and make the computing resources 302 available to process another job. Note that in embodiments, the system 300 may enable multiple instances of pooled or composed computing resources 302 to provide data and information processing in parallel and embodiments are not limited in this manner.

In embodiments, system 300 may be coupled with one or more other systems, such as investment trading systems, banking systems, regulatory systems, risk management systems, performance systems, accounting system, data warehouse systems, financial institution system, and so forth. These other systems may be coupled with system 300 via networking, such as the networking infrastructure 305 and the cloud-based infrastructure. Embodiments are not limited in this manner.

Figure 4:
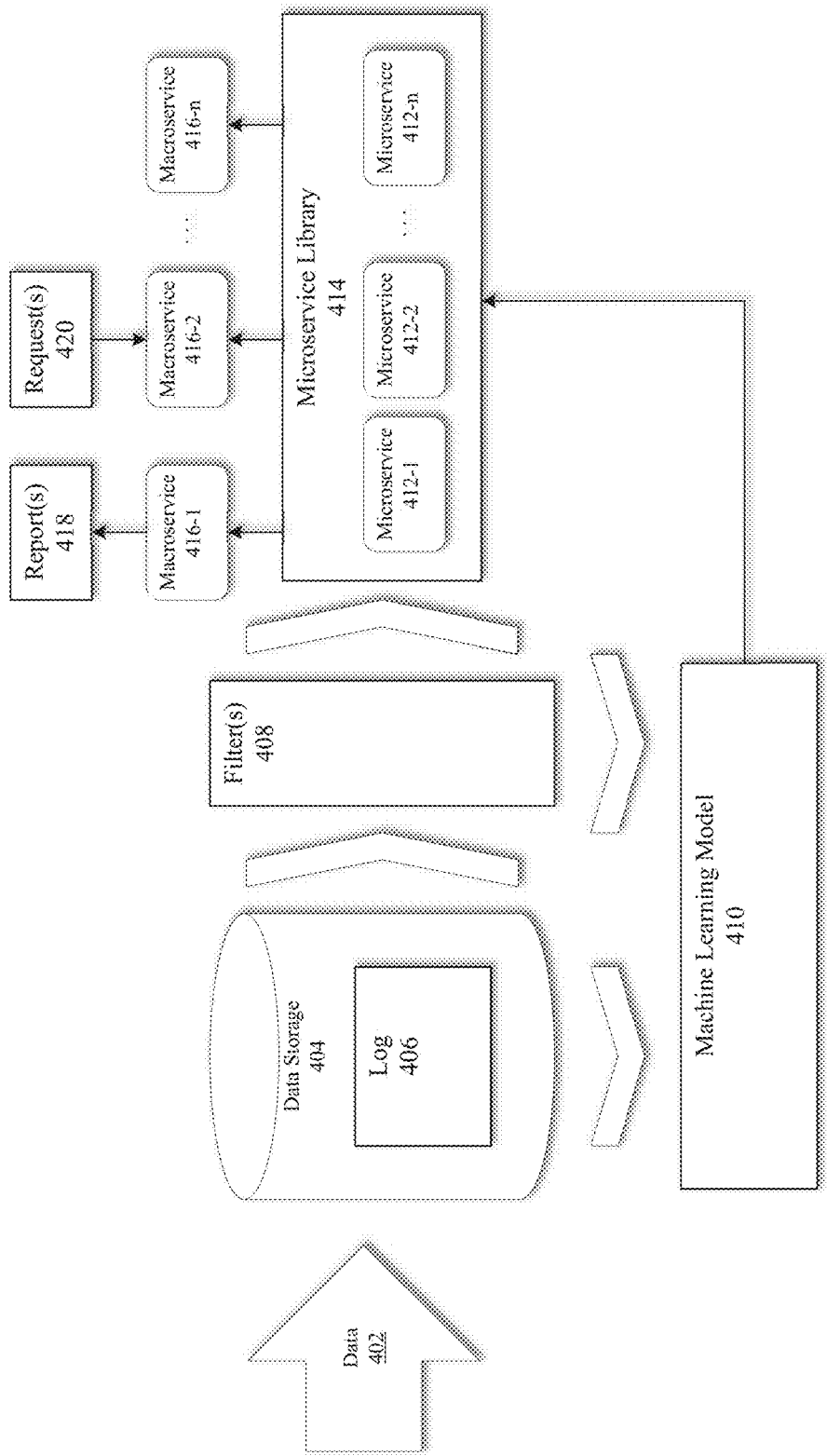
FIG. 4 illustrates an embodiment of exemplary logic and data flows through a computing architecture.

FIG. 4 depicts a block diagram 400 describing exemplary logic and data flows through a computing architecture.

Data 402 may be received in a data storage 404. The data 402 may include discrete units of data and/or one or more data streams (e.g., communication channels that repeatedly provide one or more data units at a given rate). The data 402 may include, for example, data relating to an individual user (e.g., a financial client), aggregate data (e.g., reflecting conditions in a market, such as a financial market), cancelations of previously-received data, corrections of previously-received data, etc. In some cases, cancelations and/or corrections may be received that cancels or corrects other data items that have not yet been received (e.g., due to the order in which the data was transmitted or batched, network conditions, data losses, etc.).

The data storage 404 may include hardware, software, or a combination of hardware and software suitable for storing data. The data storage 404 may include one or more data structures, such as a log 406 or a database. The data structures may be configured to store and organize the data, and/or to facilitate retrieval of the data. In some embodiments, the log 406 may be organized chronologically (e.g., in the order in which the data 402 was received by the data storage 404, in a time-stamp order of the data 402, etc.). In some embodiments, the log 406 is a persistent and/or immutable log which allows individual data records to be written, but not to be directly deleted or changed.

In some embodiments, the data 402 stored in the data storage 404 may be subjected to one or more filters 408. The filters 408 may include data governance filters which, for example, match one or more rules against the data 402 and selectively pass the data 402 to other components in the architecture.

The data storage 404 and/or the filter(s) 408 may provide information to a machine learning model 410, such as an artificial neural network (ANN). The underlying model 410 may be configured to learn associations from patterns in the data 402, to predict future trends based on historical data observations, and to provide insights into why the data 402 appears the way that it does.

A library 414 of microservices 412-$i$ may make use of the data (e.g., the raw data stored in the data storage 404, the filtered data as presented by the filters 408, information output from the machine learning model 410, or various combinations of these types of data). Each microservice 412-$i$ may represent an atomic computing unit configured to perform a defined task (e.g., computing a value for a financial variable for certain subsets of the data 402). The microservices 412-$i$ may be used individually, or variously combined into macroservices 416-$i$. The macroservices 416-$i$ may represent more complex operations in which the outputs of various microservices 412-$i$ are combined or otherwise used to perform a specified task.

For instance, one macroservice 416-1 may use the outputs of various microservices 412-$i$ to generate a report 418 (such as a financial report, disclosure form, etc.). In another example, an entity (such as a financial regulator) may issue a request 420 via a macroservice 416-2, and the microservice 416-2 may perform various operations to comply with the request (e.g., calling on another macroservice 416-1 to generate a report responsive to the request 420, correcting data 402 in the data storage 404, etc.). In some embodiments, macroservices 416-$i$ may themselves be combined together to form other macroservices 416-$i$.

The microservices 412-$i$ and/or the macroservices 416-$i$ may be exposed to a third party (e.g., by use of an application programming interface, or "API"). In some cases, a single entity may provide the microservices 412-$i$ and the macroservices 416-$i$. In other cases, one entity may provide the library 414 of microservices 412-$i$, and another entity may use the microservices 414 to generate their own customized macroservices 416-$i$.

The machine learning model 410 may be generated and/or refined via a machine learning process, such as the one depicted in the flow chart of FIG. 4. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Figure 5:
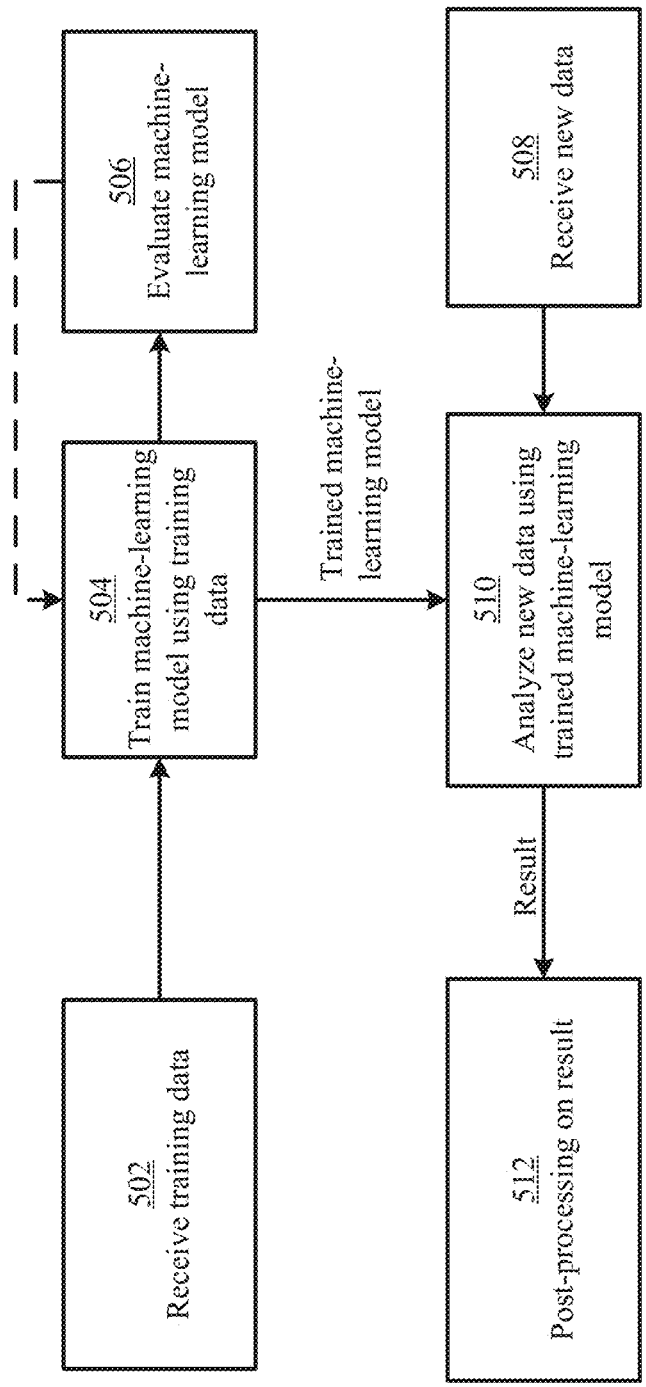
FIG. 5 illustrates an embodiment of a first logic flow.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart 500 of FIG. 5.

In block 502, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 504, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 506, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% value is an example only. A realistic and desirable accuracy percentage is dependent on the problem and the data.

In some examples, if the machine-learning model has an inadequate degree of accuracy for a particular task, the process can return to block 504, where the machine-learning model can be further trained using additional training data or otherwise modified to improve accuracy. If the machine-learning model has an adequate degree of accuracy for the particular task, the process can continue to block 508.

In block 508, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 510, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 512, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
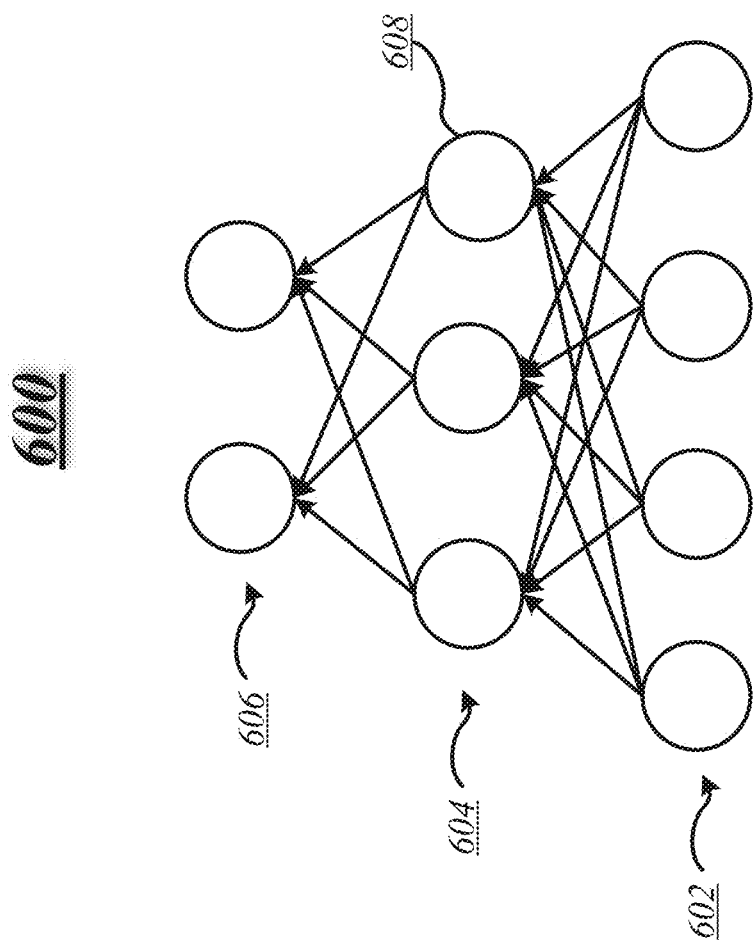
FIG. 6 illustrates an embodiment of a neural network.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600.

In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications system discussed herein.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 7:
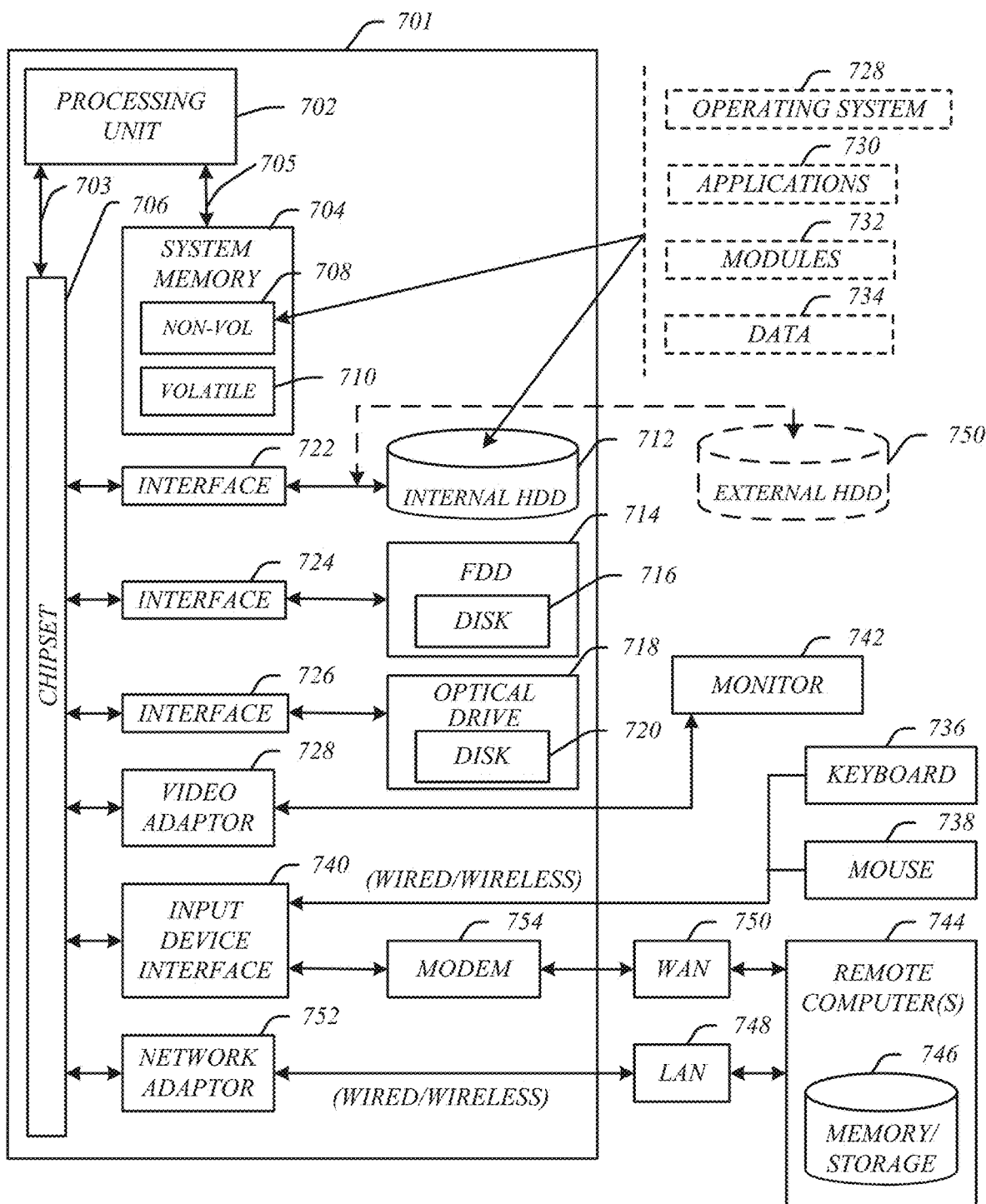
FIG. 7 illustrates an embodiment of an exemplary computing architecture.

The methods, systems, and functionality described herein may be embodied as instructions on a computer readable medium or as part of a computing architecture. FIG. 7 illustrates an embodiment of an exemplary computing architecture 700 suitable for implementing various embodiments described herein. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process executing on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a chipset 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i9™, Core m3™, vPro™, Itanium®, Pentium®, Xeon®, and XScale® processors; and similar processors. Dual microprocessors, multi-core processors, and other multi-processor architectures may also be employed as the processing unit 702.

In some embodiments, the processing unit 702 couples with the chipset 706 via a highspeed serial link 703 and couples with the system memory 704 via a highspeed serial link 705. In other embodiments, the processing unit 702 may couple with the chipset 706 and possibly other processor units via a system bus and may couple with the system memory 704 via the chipset 706. In further embodiments, the processing unit 702 and the chipset may reside in a System-On-Chip (SoC) package.

The chipset 706 provides an interface for system components including, but not limited to, the system memory 704 to the processing unit 702. The chipset 706 may couple with any of several types of bus structure that may further interconnect to a memory bus (with or without a memory controller), a peripheral bus, and a local bus using any of a variety of commercially available bus architectures. Interface adapters 722, 724, 726, 728, 740, 752, etc., may connect to the chipset 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components described herein.

A user may enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the chipset 706, but can be connected by other interfaces such as a parallel port, IEEE 694 serial port, a game port, a USB port, an IR interface, and so forth.

A monitor 742 or other type of display device is also connected to the chipset 706 via an interface, such as a video adaptor 728. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many of or all the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the chipset 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Some aspects may utilize the Internet of Things (IoT), where things (e.g., machines, devices, phones, sensors) can be connected to networks and the data from these things can be collected and processed within the things and/or external to the things. For example, with the IoT, sensors may be deployed in many different devices, and high-value analytics can be applied to identify hidden relationships and drive increased efficiencies. This can apply to both Big Data analytics and realtime (streaming) analytics.

Some systems may use Hadoop®, an open-source framework for storing and analyzing big data in a distributed computing environment. Apache™ Hadoop® is an open-source software framework for distributed computing. For example, some grid systems may be implemented as a multi-node Hadoop® cluster, as understood by a person of skill in the art. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction.

Figure 8:
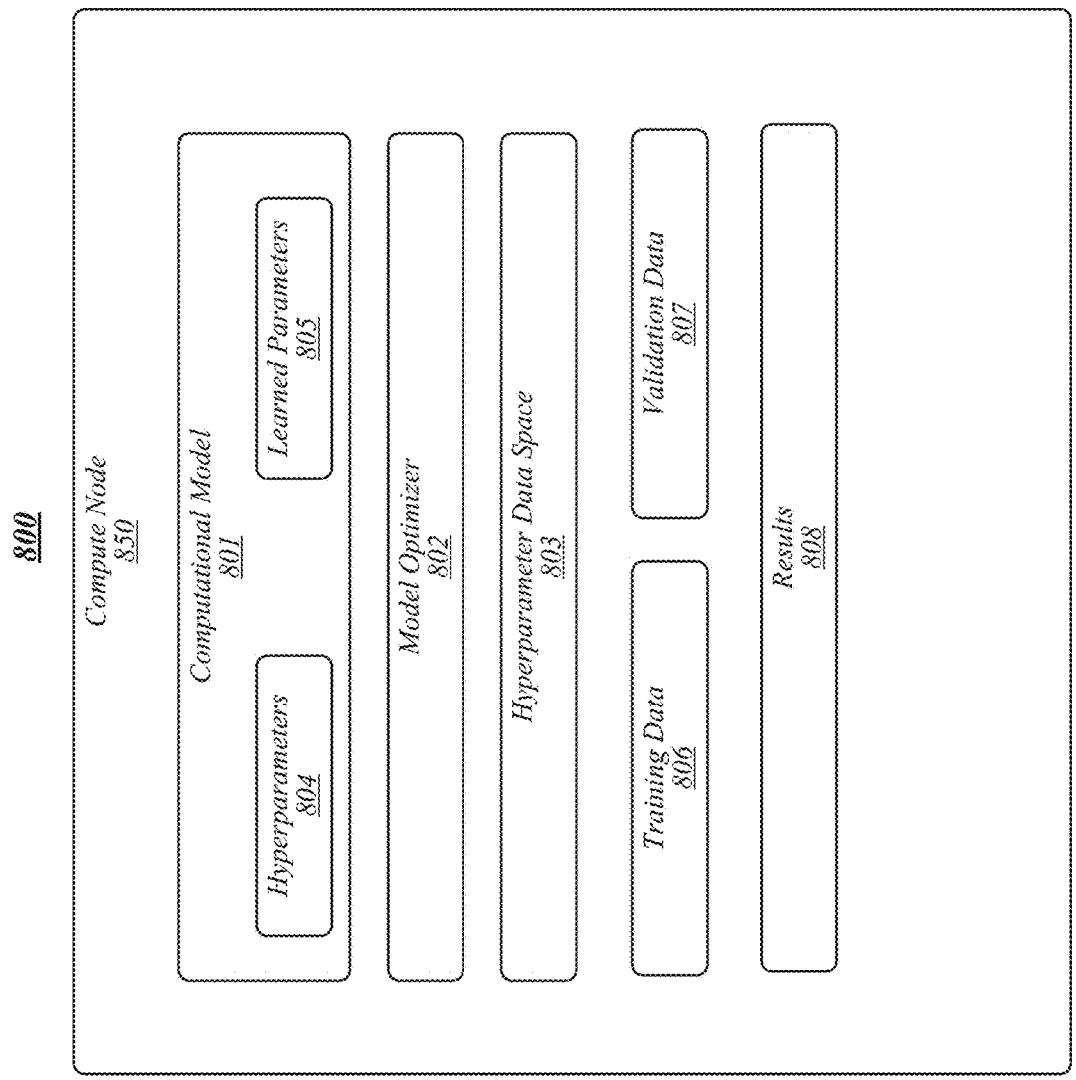
FIG. 8 illustrates an example computing system.

FIG. 8 illustrates an example of an operating environment 800 that may be representative of various embodiments. The operating environment 800 depicted in FIG. 8 includes a compute node 850. The compute node 850 is an example of the computing system 701 of FIG. 7 and includes the components of the computing system 701 (not depicted for the sake of clarity). For example, compute node 850 may include a memory and one or more processors, such central processing units (CPUs) and/or a graphics processing units (GPUs), which may have one or more cores. As another example, the compute node 850 may be representative of one or more of the compute resources (CRs) 302-1 through 302-y of FIG. 3. In such an example, code (e.g., the computational model 801 and/or model optimizer 802) may execute in parallel on one or more of the CRs 302-1 through 302-y. In one example, the compute node 850 is a component of the server farm 106. In such an example, the compute node 850 may receive training data 806 via the networks 108 and the network devices 102 and stored in the data store 110.

As shown, the compute node 850 includes a computational model 801, a model optimizer 802, a hyperparameter data space 803, training data 806, validation data 807, and results 808. In various embodiments, the computational model 801, model optimizer 802, hyperparameter data space 803, training data 806, validation data 807, and results 808 may be implemented in hardware, software, or a combination thereof.

The computational model 801 (also referred to as a computing model) is representative of any type of computational model, including, without limitation, a machine-learning (ML) model (e.g., the ML model 410), an artificial intelligence (AI) model, a neural network (NN), an artificial neural network (ANN), a convolutional neural network (CNN), a deep learning (DL) network, a deep neural network (DNN), a recurrent neural network (RNN), speech processing model, natural language processing (NLP) model, reinforcement learning (RL) model, variations and/or combinations thereof, and/or the like.

Non-limiting examples of the uses of a computational model 801 may include ranking impact and/or risk of news on portfolio holdings, streamlining investment research consumption and collaboration, operational log analytics for application monitoring and predicting outages or maintenance needs, intelligent analysis of customers, relationships, business patterns, and/or organizational detail, extraction of key information from within contract data, for instance, to identify obligations and/or risk, cross-sell product recommendations, personalize user experience based on behavioral analysis, machine-based interactive experiences, automated signature verification (for instance, on documents, faxes, automatic routing of faxes), investment fund performance (for instance, predict which funds will liquidate, which funds will return external capital, and/or the like), data quality platform (for instance, detect patterns and predict data anomalies, such as using equity quant data inputs), interpret and act on insights derived from unstructured data, quantify content from digital media sources and mobile devices to analyze potential impacts (for instance, on volatility, liquidity, earnings, etc. for a financial services operator), applied research to financial modeling problems, Environmental Social Governance (ESG) models to provide analytics services, minimize manual work required for reconciliation process. identify matches or potential matches in the custody to accounting cash reconciliation process, automate determination of Fund Credit Ratings, filter/prune alerts (for instance, more than 10 million/month) to only the most critical and important, predict borrow and lending rates, pricing, queue allocations, provide securities finance services (for instance, Names in the News, Fed Funds prediction, asset pricing, portfolio optimization, EFT price movement prediction, EFT vs. Underlier, index rebalance predictions, client comparison ranking and attribution, Create EC SL Factors for clients, predict short selling, projection of availability feed haircuts, projection on volume trading, and/or the like), accelerated new client on-boarding (for instance, map new client supplied data to internal mappings and formats), trade fail break prediction, analysis, and resolution, automate Research on Recon exceptions (SSGA and AIS), generation of portfolio performance and analytics narratives (SSGA), and/or the like.

As shown, the computational model 801 includes one or more hyperparameters 804 and one or more learned parameters 805. Generally, each hyperparameter 804 of the computational model 801 has one or more values that are defined before training of the computational model 801 is performed. Stated differently, each hyperparameter 804 has one or more values that can be tuned to control the behavior of the computational model 801. Example hyperparameters 804 include learning rate for gradient descent, decision tree depth, numbers of neurons in a neural network layer, number of layers in a neural network, convolutional kernel width, etc. Once values for the hyperparameters 804 are defined, the computational model 801 may be trained based on one or more batches of the training data 806, e.g., to learn values for the learned parameters 805. The performance of the computational model 801 may then be validated based on one or more batches of validation data 807. The performance of the model 801 may include an accuracy of the model 801 (e.g., 90% accuracy in character recognition, etc.) as well as performance characteristics when training the model 801 (e.g., amount of time, amounts of computing resources used, etc.). In some embodiments, a score that considers accuracy and performance characteristics may be computed for the model 801 using a set of values for the hyperparameters 804.

The model optimizer 802 is generally configured to optimize the values of the hyperparameters 804 that cause the corresponding model 801 to operate most efficiently and/or accurately. Generally, the range of possible values for a given hyperparameter 804 may be defined by a corresponding hyperparameter data space 803. For example, the data space 803 for a first hyperparameter 804 may specify integer values from 100-1000 as possible values for the first hyperparameter 804. As another example, the data space 803 for a second hyperparameter 804 may specify 32-bit floating point integer values as the range of possible values for the second hyperparameter. In some embodiments, the data space 803 is a multi-dimensional data space for one or more hyperparameters 804.

In some embodiments, the model optimizer 802 may perform an "initiation phase," where the model optimizer 802 learns about the data space 803 for each hyperparameter 804 of the computational model 801. For example, the model optimizer 802 may use a statistical algorithm to select one or more initial data points from the data space 803 for the hyperparameters 804. The statistical algorithm may include, but is not limited to, Latin hypercube sampling, Sobol sequences, random number generators, and the like. For example, for a two-dimensional hyperparameter 804, the model optimizer 802 may select the initial values of (2,3). Once selected, the model optimizer 802 may assign the selected values to the hyperparameter(s) 804, train the model 801 using training data 806, and validate the training using the validation data 807. Doing so allows the model optimizer 802 to determine the accuracy of the model 801. The model optimizer 802 may then store a result of the training and/or validation in a record associated with the initial values (2,3) in the results 808. Doing so reflects that the values have been previously sampled to prevent re-sampling of the same values additional times. In addition, the model optimizer 802 may determine performance characteristics (e.g., processing time, computing resources used, etc.) and/or compute a score for the selected initial values. In one embodiment, the score may be computed based on any function that considers the accuracy and/or performance characteristics. The model optimizer 802 may then store the performance characteristics and/or scores in the record for the initial values (2,3) in the results 808. The model optimizer 802 may repeat the initiation phase one or more times.

The model optimizer 802 may then initiate a "smart phase" where the model optimizer 802 generates an approximation (e.g., an estimation and/or an interpolation) of the data space 803 for each hyperparameter 804 to select one or more candidate values from the data space 803 for testing. Although any approximation, estimation, and/or interpolation technique may be used, in one embodiment, the model optimizer 802 applies a kriging or Gaussian process regression to the data space 803. More generally, any machine learning algorithm that can perform a regression on the data space 803 can be used. The model optimizer 802 may then select one or more candidate data points from the interpolated data space 803. In one embodiment, the interpolation generates estimated accuracy and/or performance values for values in the data space 803 that can be compared to other values in the data space 803 to allow the model optimizer 802 to select the "best" next hyperparameter values. For example, if a first point and a second point in the interpolated data space 803 have predicted accuracy values of 0.90 and 0.95, respectively, the model optimizer 802 may select the second point for sampling. The model optimizer 802 may then assign the values to the hyperparameters 804, train the model 801 using training data 806, and validate the training using the validation data 807. The model optimizer 802 may then determine the accuracy, performance characteristics, and/or score of the model 801 using the selected hyperparameter values and create a record in the results 808 for the selected hyperparameter values.

In some embodiments, the model optimizer 802 may select candidate values from the interpolated data space 803 using one or more additional heuristics. For example, the model optimizer 802 may consider the distance between candidate values and previously tested values (e.g., the initial values and/or any values previously tested). For example, the predicted "best" value may be (8,14). In such an example, the model optimizer 802 may determine the distance between (8,14) in the data space 803 (and/or a surface representing the data space 803) and the previously sampled initial value of (2,3). If the distance is less than a minimum threshold distance, the model optimizer 802 may refrain from testing the values of (8,14). If, however, the distance exceeds the minimum threshold distance, the model optimizer 802 may assign the values of (8,14) to the hyperparameters 804, train the model 801, validate the training of the model 801, and store the accuracy, performance characteristics, and/or scores for the values of (8,14) in the results 808.

As another example, the model optimizer 802 may explore "unknown" areas of the data space 803. For example, the model optimizer 802 may apply an algorithm that searches for regions of the data space 803 that have the lowest numbers of sampled data points (e.g., the least densely sampled regions of the data space 803). For example, the model optimizer 802 may partition the data space into a plurality of regions, including a first region and a second region. The model optimizer 802 may then determine that 2 values have been sampled from the first region and 10 values have been sampled from the second region. As such, the model optimizer 802 may select one or more values from the first region of the data space 803. Again, the model optimizer 802 may assign the selected values from the first region of the data space 803 to the hyperparameters 804, train the model 801, validate the training of the model 801, and store the accuracy, performance characteristics, and/or scores for the selected values in the results 808.

As another example, the model optimizer 802 may expand the search domain (e.g., the data space 803) to select values. Generally, if a candidate value in the data space 803 is near an edge of the data space 803, the model optimizer 802 may expand the data space 803. For example, if a candidate (x,y) value is (99,99) and the maximum (x,y) values in the data space 803 are (100,100), the model optimizer 802 may expand the data space 803 such that the maximum values are increased (e.g., to (110,110), (200, 200), etc.). The model optimizer 802 may then select candidate values from the expanded data space 803 (e.g., select (102, 102), etc.), test the performance of the model 801 using the selected values for the hyperparameters 804, and create a record in the results 808 for the selected values, which may include the accuracy, performance characteristics, and/or a score. In one embodiment, the model optimizer 802 expands the data space 803 upon determining the candidate value is in a region of the data space 803 that has other values with high accuracy, performance characteristics, and/or scores. For example, if the value (99,99) is in a region having an average accuracy value that exceeds a threshold accuracy value, the model optimizer 802 may expand the data space 803. Otherwise, the model optimizer 802 may refrain from expanding the data space 803.

In some embodiments, the model optimizer 802 may consider uncertainty when optimizing values for the hyperparameters 804. For example, the model optimizer 802 may consider uncertainty intervals when creating a training dataset 806 and validation dataset 807 and to train and test a model 801 and determine the performance of the model using a given set of values for the hyperparameters 804. For example, the training dataset 806 may comprise 80% of a total dataset and the validation dataset 807 may comprise the remaining 20% of the total dataset. Using this 80/20 split of the total dataset, the computational model 801 may have an accuracy of 75%. However, when splitting the total dataset in a manner where 85% is allocated to the training dataset 806 and 15% is allocated to the validation dataset 807, the accuracy may change to 70%, 80%, or some other value. Therefore, the model optimizer 802 may consider the uncertainty of each split when optimizing the hyperparameter values. For each split, the model optimizer 802 determines a region of uncertainty in the data space 803. Therefore, for example, if an example hyperparameter value is 20, the uncertainty interval may be +/−3. Therefore, the uncertainty region may include all possible values from 17 through 23, and the model optimizer 802 may select hyperparameter values from the uncertainty region of 17 through 23.

More generally, the model optimizer 802 considers the uncertainty of the model 801 using the corresponding split. Doing so may expose additional values in the hyperparameter data space 803 (e.g., a probability distribution for the values in the data space 803) that may be the optimal values for the hyperparameters 804. By receiving a probability distribution as input, the model optimizer 802 may output a distribution of scores. Stated differently, the model optimizer 802 may output multiple scores for the same hyperparameter value that generates uncertainty, even if the model optimizer 802 previously sampled the hyperparameter value. The model optimizer 802 may consider the uncertainty during interpolation and/or when optimizing the values according to the heuristics described herein. The model optimizer 802 may then select one or more values from the portion of the data space 803 having the highest scores from the distribution. Once selected, the model optimizer 802 may then assign the values from the data space 803 that correspond to the determined uncertainty values as values for the hyperparameters 804. The model optimizer 802 may then train the model 801 using the assigned hyperparameter values, determine the accuracy of the trained model 801 using the validation data 807 and/or determine any performance attributes and/or scores for the trained model 801. Doing so allows the model optimizer 802 to consider the uncertainty when optimizing values for the hyperparameters 804.

The model optimizer 802 may continue to sample values for the hyperparameters 804 according to one or more of the above heuristics any number of times. In some embodiments, the model optimizer 802 may stop sampling values upon reaching a stopping point (e.g., after sampling a specified number of values in the data space 803, until the average accuracy (and/or performance metric and/or score) of the model 801 using the sampled values in the data space 803 exceeds a threshold accuracy (and/or performance metric and/or score), and/or an average increase in accuracy (and/or performance metric and/or score) of the model 801 over a previous number of sampled values exceeds a threshold increase). The model optimizer 802 may then assign the best performing values to the hyperparameters 804 of the computational model 801. The computational model 801 may then perform runtime processing operations (e.g., based on data stored in the log 406) using the optimized values for the hyperparameters.

In some embodiments, the model optimizer 802 may leverage parallel processing to sample hyperparameter values from the data space 803. For example, multiple instances of the model optimizer 802 may be executing on the compute node 850 (e.g., one instance of the model optimizer 802 on each of a plurality of processor cores of the compute node 850). As another example, multiple instances of the model optimizer 802 may execute on other compute nodes communicably coupled to the compute node 850 via a network. Regardless of the implementation, each instance of the model optimizer 802 may have read/write access to the data space 803 and/or the results 808 as well as respective instances of the computational model 801, training data 806, and validation data 807. Doing so allows each instance of the model optimizer 802 to sample values from the data space 803, assign the sampled values to the hyperparameters 804, train the model 801 using the training data 806, validate the results using the validation data 807, and generate a record for the sampled values in the results 808 in parallel. This parallel sampling/testing process may be completed until a stopping point is reached as described above.

In some embodiments, the computing model 801 corresponds to the ML model 410 of FIG. 4. In such embodiments, the model optimizer 802 may optimize the hyperparameter values for the ML model 410. For a given set of hyperparameter values for the ML model 410, the ML model 410 may be generated by drawing data 402 from the log 406 and through the filters 408 as training data. The training data may then be processed by the ML model 410 during which parameter values of the ML model 410 are learned. A portion of the data 402 drawn from the log 406 and through the filters 408 may be used as validation data to test the performance of the ML model 410 using the hyperparameter values selected by the model optimizer 802. The model optimizer 802 may then analyze the performance of the ML model 410 using the selected hyperparameter values (e.g., accuracy, performance attributes, and/or scores). The model optimizer 802 may then update the results 808 for the hyperparameter values of the ML model 410. The model optimizer 802 may repeat the process any number of times according to the heuristics described herein to optimize the hyperparameter values for the ML model 410.

Figure 9A:
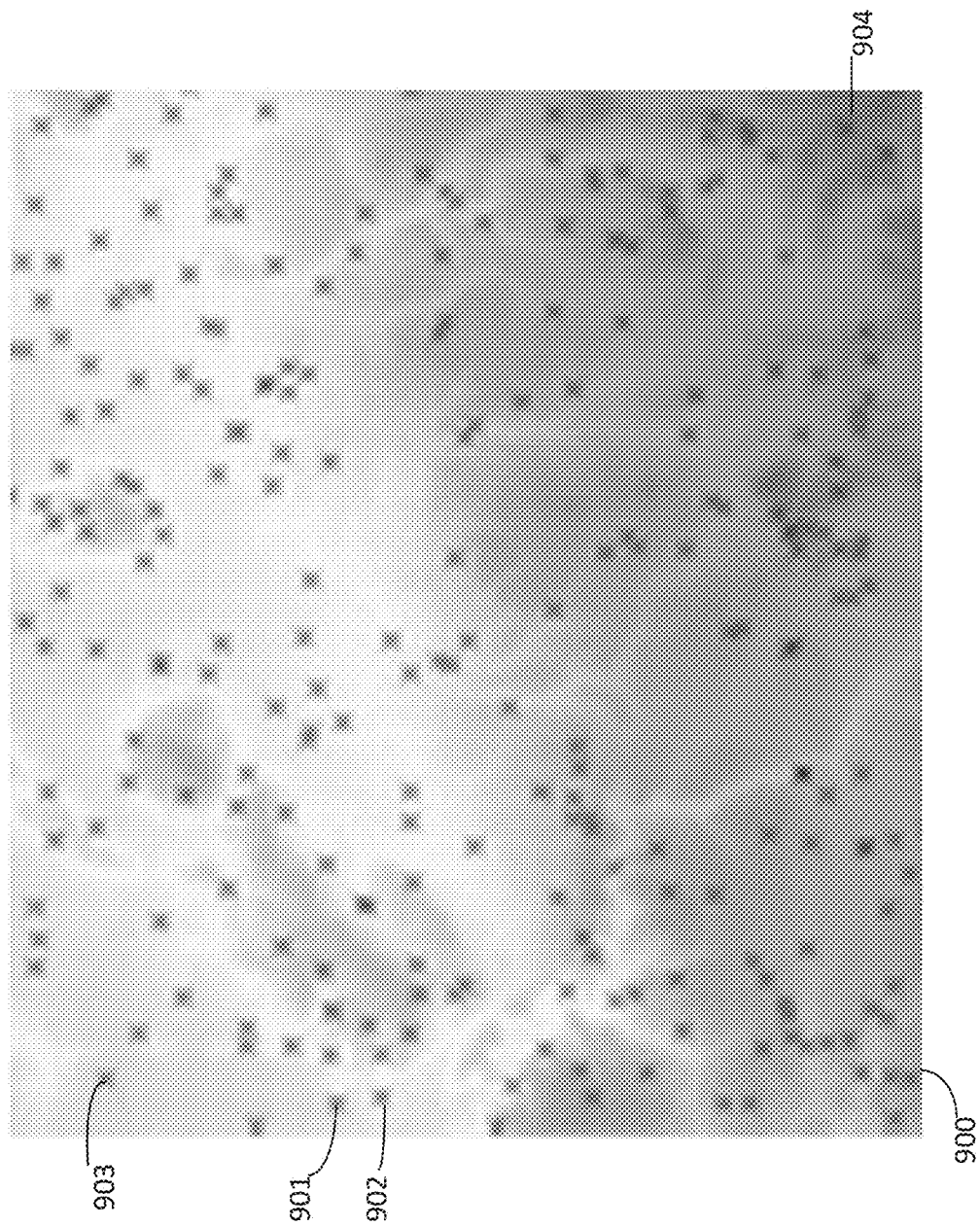
FIGS. 9A-9B illustrate examples of hyperparameter optimization.

FIG. 9A illustrates an example surface 900 generated by the model optimizer 802 based on an interpolation of example hyperparameter data space 803. Generally, the surface 900 reflects a plurality of (x,y) points in the data space 803, where an "x" corresponds to a data point and the shading of the surface 900 reflects the score (and/or accuracy and/or performance characteristics) of the corresponding points in the data space 803. Generally, lighter shades are associated with lower scores, while darker shades are associated with higher scores.

As stated, the model optimizer 802 may sample values from the data space 803 according to one or more heuristics. For example, if point 901 is predicted to be the "best" candidate value based on the interpolation, the model optimizer 802 may compare the distance of point to other previously sampled data points. In such an example, the model optimizer 802 may determine that the distance between previously sampled data point 902 and data point 901 is less than a threshold distance, and refrain from sampling data point 901. In such an example, the model optimizer 802 may determine that the distance between point 903 and other adjacent points greater than the threshold distance and sample the values at point 903. In another embodiment, the model optimizer 802 may select the values at point 903 upon determining that the region of the surface 900 that includes point 903 includes the least number of previously sampled points (relative to other regions of the surface 900). In some embodiments, the model optimizer may determine that point 903 is within an area of uncertainty relative to point 901 and sample the value at point 903 based on the uncertainty.

Figure 9B:
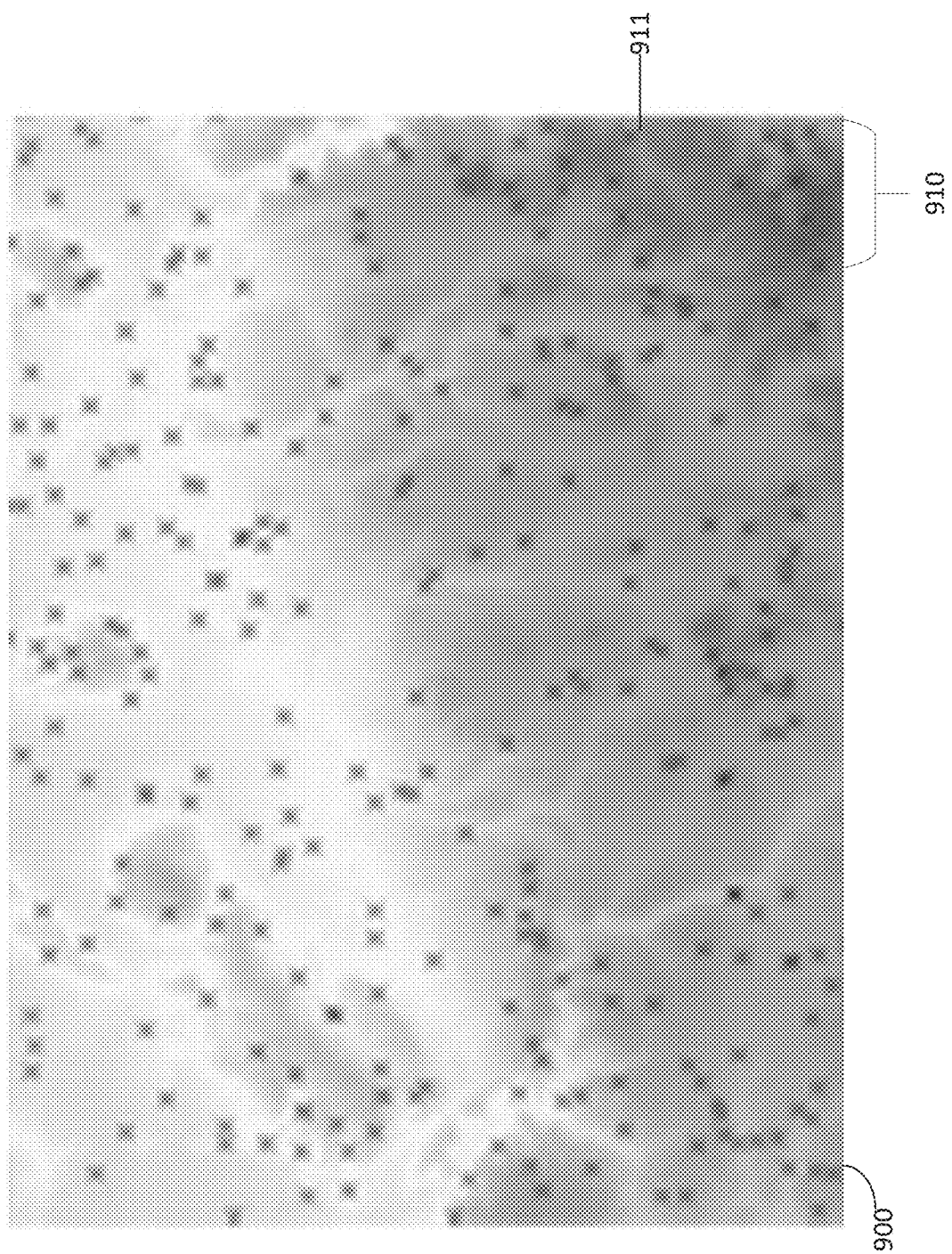

As shown, a candidate point 904 is near the edge of the surface 900 and is in a region that has darker shading, reflecting that nearby data points have had high scores (and/or accuracy values and/or performance metrics). As such, the model optimizer 802 may expand the data space 803 to include additional candidate values. FIG. 9B depicts an embodiment where the data space 803 has been expanded. Specifically, as shown, the surface 900 includes an additional area 910 that was not present in the surface depicted in FIG. 9A. As such, the model optimizer 802 may sample the values at point 911 within region 910. The model optimizer 802 may then train the model 801 using the sampled values at point 911, validate the trained model, and store the results (accuracy, performance characteristics, and/or scores) in the results 808.

Figure 10A:
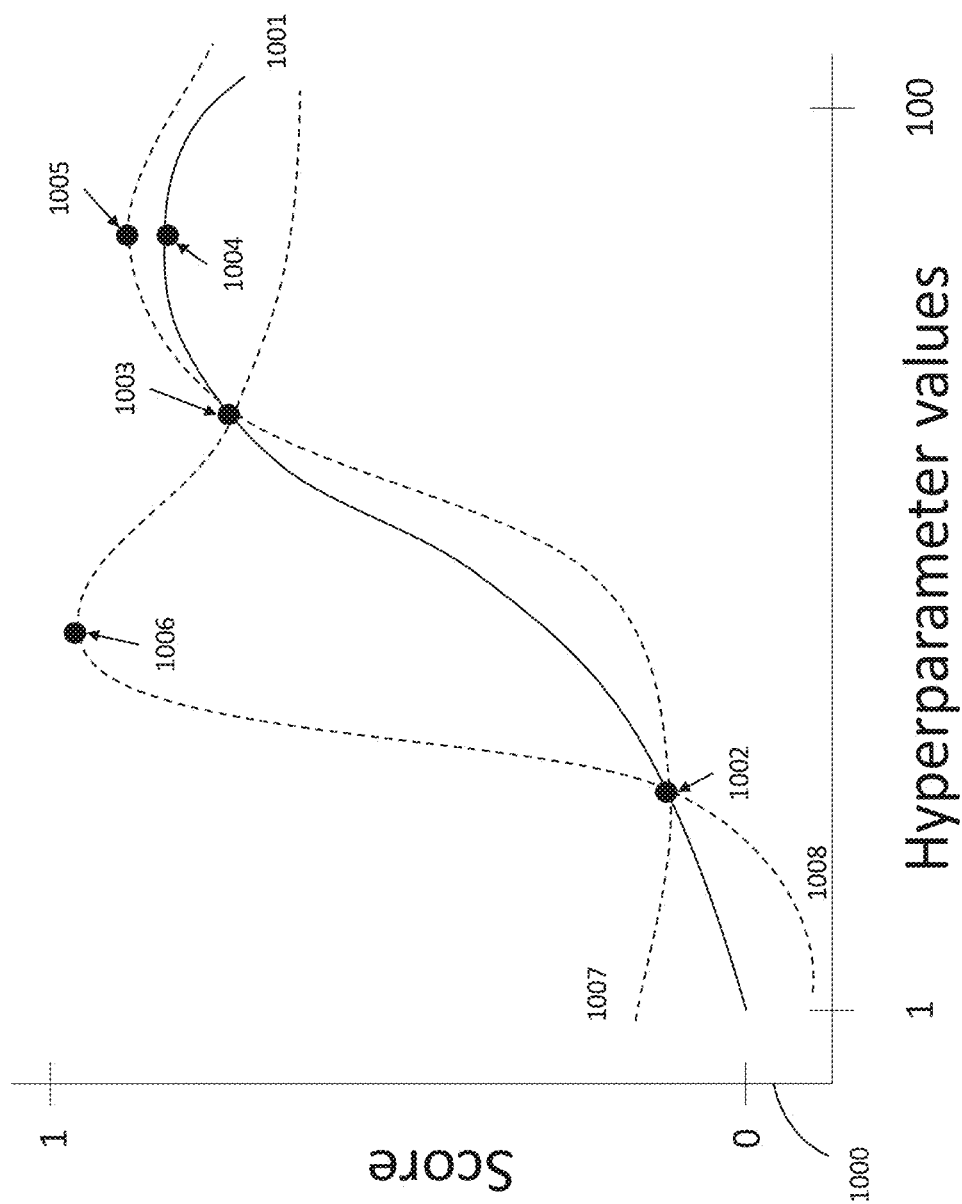

FIG. 10A illustrates an example graph 1000 depicting results generated by the model optimizer 802 based on an interpolation of example hyperparameter data space 803. As shown, the x-axis of the graph 1000 corresponds to values for one or more hyperparameters 804, which may range from 1-100 in this example. The y-axis of the graph 1000 corresponds to scores for a model 801 using the corresponding value for the hyperparameter. In FIG. 10A, a curve 1001 may be generated based on two sampled points 1002 and 1003. The curve 1001 may illustratively represent interpolated values in the hyperparameter data space 803 that are generated based at least in part on the scores for the hyperparameter values at points 1002, 1003.

As stated, the model optimizer 802 may consider uncertainty when selecting hyperparameter values from the data space 803 for sampling. The dashed lines 1007, 1008 in FIG. 10A correspond to different uncertainty values, e.g., of the interpolation of the curve 1001. For example, curve 1007 may correspond to the uncertainty for a first data split (e.g., 70% training data and 30% validation or test data) when training the model 801, while curve 1008 may correspond to the uncertainty for a second data split (e.g., 80% training data and 20% validation data). In some embodiments, based on the curve 1003, the model optimizer 802 may select the hyperparameter value at point 1004 as the next "best guess" for the hyperparameter 804. However, as shown, the hyperparameter value corresponding to point 1005 of uncertainty line 1007 may produce a higher score than the value at point 1004. Furthermore, point 1006 of curve 1008 has a score higher than points 1003, 1004, and all points on curves 1001, 1007, and 1008. Therefore, in some embodiments, the model optimizer 802 may select the hyperparameter value at points 1005 or 1006, assign the values at points 1005 or 1006 to the hyperparameter 804, train the model 801, and validate the results as described above.

FIG. 10B illustrates a graph 1010 depicting results generated by the model optimizer 802. In FIG. 10B, the solid line corresponds to an interpolation generated by the model optimizer 802 based on two or more sampled values for the hyperparameter 804 and the scores for the model 801 using the sampled values for the hyperparameter 804. Similarly, the dashed lines may correspond to uncertainty of the interpolation. In the example depicted in FIG. 10B, the model optimizer 802 may consider a distribution of scores for hyperparameter values. The distribution may correspond to any factor which may cause fluctuations in the measured performance of the model 801 using the hyperparameter values. These factors may include different splits of the training/validation datasets. Stated differently, as shown, points 1011-1013 result in different scores for the same hyperparameter value using different splits and/or training runs for the model 801. Similarly, points 1014-1016 result in different scores for the same hyperparameter value using different splits and/or training runs for the model 801. However, the uncertainty is not reduced to zero in any example. Therefore, the model optimizer 802 may consider the distribution of different values, e.g., across different splits of the training data and validation data, when selecting hyperparameter values for sampling. In some embodiments, when generating an interpolation of a data space 803, the model optimizer 802 considers the different values (e.g., the uncertainty) of the results for different sampled hyperparameter values. In some embodiments, the model optimizer 802 generates a distribution as output based on a distribution received as input. For example, the points 1011-1013 and 1014-1016 may be the output of the optimizer. Furthermore, these values may be selected at a greater confidence than values at points 1017 and/or 1018, as the uncertainty for these values is greater than the uncertainty at points 1011-1013 and 1014-1016. For example, the points at 1011-1013 and 1014-1016 may reflect the uncertainty in the upper and lower 95% confidence intervals for the solid curve. By considering the uncertainty, the model optimizer 802 may provide a more realistic view of the performance estimation, allowing the model optimizer 802 to make more confident decisions for the next hyperparameter value being sampled and tested.

Figure 11:
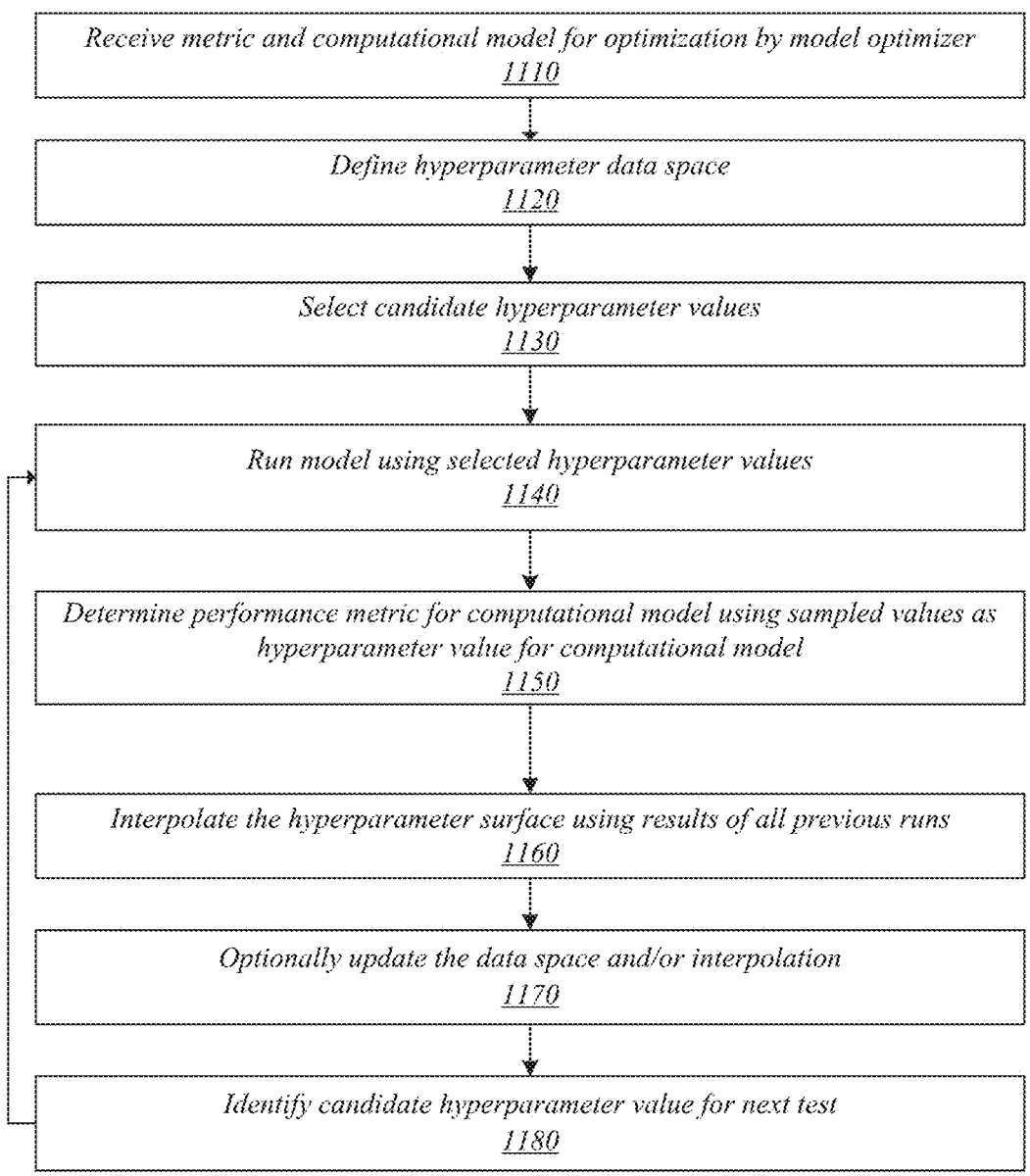
FIG. 11 illustrates an embodiment of a second logic flow.

FIG. 11 illustrates an example of a logic flow 1100 that may be representative of some or all the operations executed by one or more embodiments described herein. For example, the model optimizer 802 may perform some or all of the logic flow 1100 to optimize values for hyperparameters 804 of the computational model 801. Embodiments are not limited in this context.

As shown, at block 1110, the model optimizer 802 may receive a computational model 801 having one or more hyperparameters 804 for optimization. The model optimizer 802 may include a meta ML model that guides the algorithm to find candidate values in the data space 803 for a hyperparameter 804 of the computational model 801. The meta ML model may be any regression model. At block 1120, the hyperparameter data space 803 is defined. The definition of the data space 803 may include all possible values for the hyperparameter 804 and/or a subset of the possible values for the hyperparameter 804. At block 1130, the model optimizer 802 may select one or more candidate values for the hyperparameter 804 from the data space 803. The model optimizer 802 may select the candidate values according to any technique. For example, the model optimizer 802 may select the candidate values based on one or more of: random sampling, a sampling method that uses Quasi Monte Carlo sampling techniques based on Low Discrepancy Sequences (LDS) (e.g., Latin hypercube sampling, Latin hypercube-Hammersley sequence sampling (LHHS), Halton sequencing, Hammersley sequencing, Sobol numbers, Faure sequencing, Korobov sequences, Niederreiter sequences, etc.), and/or any sampling method that combines Low Discrepancy Sequences and/or semi random sampling methods, including Halton Sequence Sampling, Sobol Sequence Sampling, Scrambled Sobol Sampling, Hammersley Sequence Sampling (HSS), Leaped Hammersley Sampling, Latin hypercube-Hammersley sequence sampling (LHHS) (LHS-HSS), and Latin Hypercube-Sobol Sampling (LHS-SOBOL).

At block 1140, the model optimizer 802 assigns the values of the sampled data points to the hyperparameter(s) 804 of the computational model 801, runs (or trains) the model 801 using training data 806, and validates the training using the validation data 807. In one embodiment, multiple runs of the model 801 are performed at block 1140 using different splits of the training data 806 and the validation data 807. At block 1150, the model optimizer 802 may determine the accuracy, performance characteristics, and/or score of the model 801 using the selected hyperparameter values and create a record in the results 808 for the selected hyperparameter values.

At block 1160, the model optimizer 802 may interpolate the data space 803 for the hyperparameter 804 using a machine learning algorithm and all previous results (e.g., based on all previous results of training the model 801 using different hyperparameter values). As stated, the model optimizer 802 may consider the uncertainty of the scores of previously sampled data points in the data space 803 when generating the interpolation. The model optimizer 802 may use any ML algorithm that can perform a regression as described above with reference to block 1110. At block 1170, the model optimizer 802 optionally update the intervals of the hyperparameter data space and/or update the interpolation. At block 1180, the model optimizer 802 selects one or more candidate values for sampling. Generally, the model optimizer 802 may identify one or more candidate values in the interpolated data space 803 as the "best" value, e.g., based on a score for the values computed at block 1150. In one embodiment, the model optimizer 802 may select the candidate value based on distance to other sampled values. In other embodiments, the model optimizer 802 may determine whether a candidate value is in a densely sampled region of the data space 803, and/or expand the data space 803. In another embodiment, the model optimizer 802 may select a candidate value corresponding to the point with the highest uncertainty in the interpolated space. In another embodiment, the model optimizer 802 may select a point in the least investigated area of the data space 803. In yet another embodiment, the model optimizer 802 may select a point generated based on Gibbs sampling using the interpolation surface as the probability distribution. More generally, the model optimizer 802 may use any strategy to select candidate data points that includes one or more of the interpolated surface, considers the previously tested values, the distance from the previously tested values, and/or the uncertainty of the interpolated surface as input.

The model optimizer 802 may then return to block 1140 to run and/or test the model 801 using the hyperparameter values selected at block 1180. Doing so allows the model optimizer 802 to compare the values in the results 808 to identify the best performing hyperparameter values based on accuracy, performance characteristics, and/or scores. The model optimizer 802 may repeat the blocks of the logic flow 1100 any number of times to sample additional points from the data space 803. In some embodiments, the model optimizer 802 executes the loop including blocks 1140-1180 until a predefined stopping criterion is reached (e.g., after sampling a specified number of values in the data space 803, until the average accuracy (and/or performance metric and/or score) of the model 801 using the sampled values in the data space 803 exceeds a threshold accuracy (and/or performance metric and/or score), and/or an average increase in accuracy (and/or performance metric and/or score) of the model 801 over a previous number of sampled values exceeds a threshold increase). Furthermore, as stated, a plurality of different instances of the model optimizer 802 may independently perform the blocks of the logic flow 1100 any number of times, thereby implementing parallelism.

Figure 12:
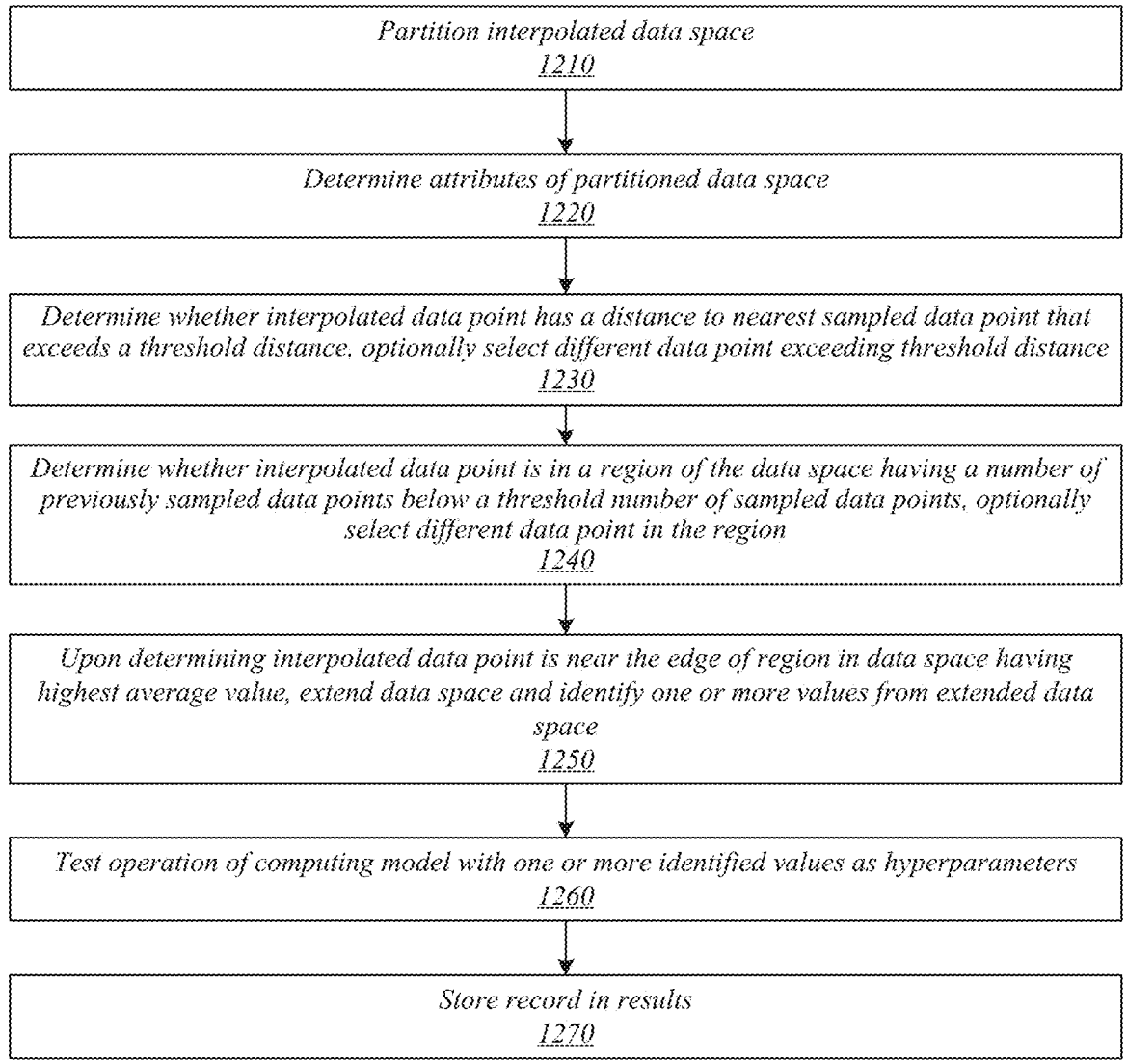
FIG. 12 illustrates an embodiment of a third logic flow.

FIG. 12 illustrates an example of a logic flow 1200 that may be representative of some or all the operations executed by one or more embodiments described herein. For example, the model optimizer 802 may perform some or all of the logic flow 1200 to optimize values for hyperparameters 804 of the computational model 801. Embodiments are not limited in this context.

As shown, at block 1210, the model optimizer 802 may partition the interpolated data space 803 into a plurality of regions. In one embodiment, a result of the interpolation may include the partitioning the data space 803. In some embodiments, the model optimizer 802 considers uncertainty values when interpolating and/or partitioning the data space 803. In other embodiments, the model optimizer 802 may create "n" equal regions of the data space 803, where n is a positive integer. At block 1220, the model optimizer 802 may compare the distance of the data point identified at block 1140 to the nearest previously sampled data point in the data space 803 to a minimum threshold distance. If the distance is lower than the threshold, the model optimizer 802 may select a different data point that has a distance greater than the threshold to one or more other previously sampled data points.

At block 1240, the model optimizer 802 may determine whether the data point identified at block 1140 (and/or the different data point selected at block 1230) is in a region of the partitioned data space 803 having a number of previously sampled data points that is below a threshold number of previously sampled data points (e.g., whether the region is a densely sampled region). If the number of previously sampled data points of the region is above the threshold (e.g., the region has been densely sampled), the model optimizer 802 may select a data point from a less densely sampled region. At block 1250, the model optimizer 802 may expand the data space 803 upon determining that the data point identified at block 1140 (and/or the different data points selected at block 1230 and/or block 1240) is near (e.g. within a threshold distance) of the edge of the data space 803. In one embodiment, the model optimizer 802 further determines whether the data point is in a region having the highest average score (or accuracy and/or performance metric) for previously sampled values. Once the data space 803 is expanded, the model optimizer 802 may select a data point from the expanded data space 803.

At block 1260, the model optimizer 802 may test operation of the computational model 801 using one or more of the hyperparameter values selected at block 1140, 1230, 1240, and/or 1250. More specifically, the model optimizer 802 may assign selected values to the hyperparameters 804, train the model 801 using the training data, validate the training of the model 801 using validation data. At block 1270, the model optimizer 802 may store the accuracy, performance characteristics, and/or scores for the selected values in the results 808. Doing so allows the model optimizer 802 to compare the values in the results 808 to identify the best performing hyperparameter values based on accuracy, performance characteristics, and/or scores. The model optimizer 802 may repeat the steps of the logic flow 1200 any number of times to optimize the values of the hyperparameters 804.

Figure 13:
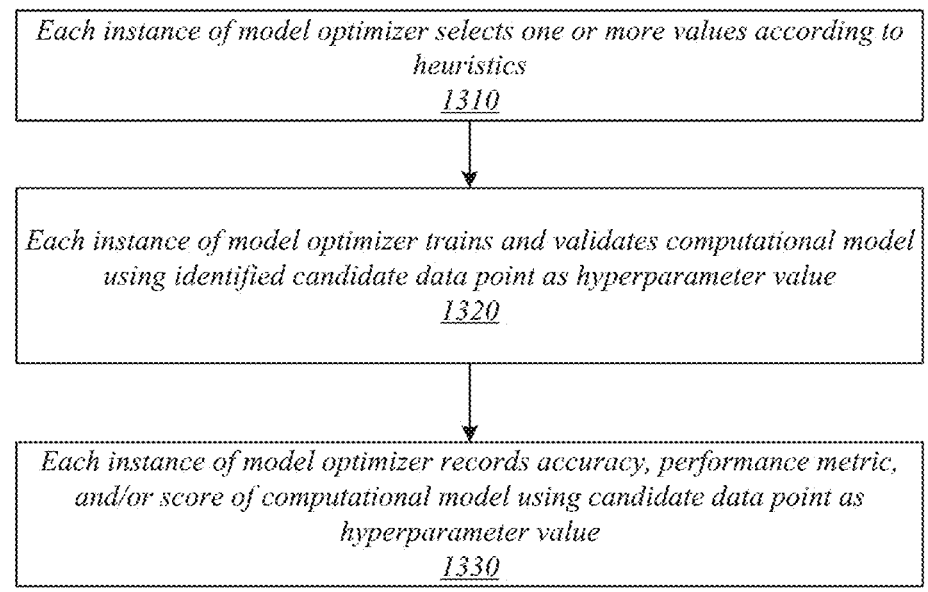
FIG. 13 illustrates an embodiment of a fourth logic flow.

FIG. 13 illustrates an example of a logic flow 1300 that may be representative of some or all the operations executed by one or more embodiments described herein. For example, multiple instances of the model optimizer 802 may perform some or all of the logic flow 1300 to optimize values for hyperparameters 804 of the computational model 801 in parallel. Embodiments are not limited in this context.

As shown, at block 1310, each instance of a plurality of instances of the model optimizer 802 selects one or more values from the data space 803 for each hyperparameter 804 of the computational model 801 according to the heuristics described above. For example, the instances of the model optimizer 802 may select values based on one or more steps of the logic flows 1100 and/or 1200. At block 1320, each instance of the model optimizer 802 assigns the values selected at block 1310 to the hyperparameter 804, trains the model 801 based on training data, validates the model 801 based on validation data. Doing so allows the model optimizer 802 to determine the accuracy, performance metrics, and/or scores for each model 801 using the hyperparameter values selected at block 1310. At block 1330, the model optimizer 802 may store a record in the results 808 reflecting the accuracy, performance metrics, and/or scores for the model 801 using the hyperparameter values selected at block 1310.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

What is claimed is:

1. An apparatus, comprising:
    a processor; and
    a memory storing instructions which when executed by the processor cause the processor to:
        receive a plurality of sampled values for a hyperparameter of a computational model, the plurality of sampled values comprising a subset of a plurality of possible values for the hyperparameter, each sampled value associated with a respective performance metric for the computational model with the sampled value assigned to the hyperparameter;
        determine a first candidate value from the plurality of possible values in a search space, wherein the first candidate value is not one of the plurality of sampled values;
        assign the first candidate value to the hyperparameter of the computational model;
        determine a first performance metric for the computational model based on training data and validation data processed by the computational model with the first candidate value assigned to the hyperparameter;
        partition the search space into a plurality of regions;
        determine a first region of the plurality of regions having a lowest count of the plurality of sampled values relative to the remaining regions of the plurality of regions;
        determine a second candidate value in the first region;
        assign the second candidate value to the hyperparameter of the computational model; and
        determine a second performance metric for the computational model based on training data and validation data processed by the computational model with the second candidate value assigned to the hyperparameter.

2. The apparatus of claim 1, the memory storing instructions which when executed by the processor cause the processor to:
    compare the first and second performance metrics; and
    determine, based on the comparison, a greater one of the first and second performance metrics; and
    assign, to the hyperparameter, the candidate value corresponding to the greater one of the first and second performance metrics.

3. The apparatus of claim 1, the memory storing instructions which when executed by the processor cause the processor to:
    interpolate the plurality of sampled values to generate a plurality of interpolated values, each interpolated value associated with an estimated performance metric corresponding to the computational model with the interpolated value assigned to the hyperparameter, the interpolation based at least in part on a respective uncertainty of previously sampled hyperparameter values.

4. The apparatus of claim 3, the memory storing instructions which when executed by the processor cause the processor to:
    determine, based on the interpolation, a first interpolated value of the plurality of interpolated values having the greatest estimated performance metric relative to the remaining plurality of interpolated values;
    determine that the first interpolated value as is within a first region of a plurality of regions of the search space, the first region having a greatest average estimated performance metric; and
    expand the search space to include an additional region, the additional region comprising a plurality of additional possible values for the hyperparameter.

5. The apparatus of claim 4, the memory storing instructions which when executed by the processor cause the processor to:
assign a first additional possible value of the plurality of additional possible values in the additional region to the hyperparameter; and
determine an actual performance metric for the computational model based on training data and validation data processed by the computational model with the first additional possible value assigned to the hyperparameter.

6. The apparatus of claim 1, the memory storing instructions which when executed by the processor cause the processor to:
train the computational model using the training data and the first candidate value assigned to the hyperparameter of the computational model; and
validate the computational model using the validation data to generate the first performance metric for the computational model with the first candidate value assigned to the hyperparameter.

7. A non-transitory computer-readable storage medium storing instructions that when executed by a processor circuit cause the processor circuit to:
receive a plurality of sampled values for a hyperparameter of a computational model, the plurality of sampled values comprising a subset of a plurality of possible values for the hyperparameter, each sampled value associated with a respective performance metric for the computational model with the sampled value assigned to the hyperparameter;
determine a first candidate value from the plurality of possible values in a search space, wherein the first candidate value is not one of the plurality of sampled values;
assign the first candidate value to the hyperparameter of the computational model;
determine a first performance metric for the computational model based on training data and validation data processed by the computational model with the first candidate value assigned to the hyperparameter;
partition the search space into a plurality of regions;
determine a first region of the plurality of regions having a lowest count of the plurality of sampled values relative to the remaining regions of the plurality of regions;
determine a second candidate value in the first region;
assign the second candidate value to the hyperparameter of the computational model; and
determine a second performance metric for the computational model based on training data and validation data processed by the computational model with the second candidate value assigned to the hyperparameter.

8. The computer-readable storage medium of claim 7, storing instructions that when executed by the processor circuit cause the processor circuit to:
compare the first and second performance metrics; and
determine, based on the comparison, a greater one of the first and second performance metrics; and
assign, to the hyperparameter, the candidate value corresponding to the greater one of the first and second performance metrics.

9. The computer-readable storage medium of claim 7, storing instructions that when executed by the processor circuit cause the processor circuit to:
interpolate the plurality of sampled values to generate a plurality of interpolated values, each interpolated value associated with an estimated performance metric corresponding to the computational model with the interpolated value assigned to the hyperparameter, the interpolation based at least in part on a respective uncertainty of previously sampled hyperparameter values.

10. The computer-readable storage medium of claim 9, storing instructions that when executed by the processor circuit cause the processor circuit to:
determine, based on the interpolation, a first interpolated value of the plurality of interpolated values having the greatest estimated performance metric relative to the remaining plurality of interpolated values;
determine that the first interpolated value as is within a first region of a plurality of regions of the search space, the first region having a greatest average estimated performance metric; and
expand the search space to include an additional region, the additional region comprising a plurality of additional possible values for the hyperparameter.

11. The computer-readable storage medium of claim 10, storing instructions that when executed by the processor circuit cause the processor circuit to:
assign a first additional possible value of the plurality of additional possible values in the additional region to the hyperparameter; and
determine an actual performance metric for the computational model based on training data and validation data processed by the computational model with the first additional possible value assigned to the hyperparameter.

12. The computer-readable storage medium of claim 7, storing instructions that when executed by the processor circuit cause the processor circuit to:
train the computational model using the training data and the first candidate value assigned to the hyperparameter of the computational model; and
validate the computational model using the validation data to generate the first performance metric for the computational model with the first candidate value assigned to the hyperparameter.

13. A method, comprising:
receiving a plurality of sampled values for a hyperparameter of a computational model, the plurality of sampled values comprising a subset of a plurality of possible values for the hyperparameter, each sampled value associated with a respective performance metric for the computational model with the sampled value assigned to the hyperparameter;
determining a first candidate value from the plurality of possible values in a search space, wherein the first candidate value is not one of the plurality of sampled values;
assigning the first candidate value to the hyperparameter of the computational model; and
determining, by a processor circuit, a first performance metric for the computational model based on training data and validation data processed by the computational model with the first candidate value assigned to the hyperparameter;
partitioning the search space into a plurality of regions;
determining a first region of the plurality of regions having a lowest count of the plurality of sampled values relative to the remaining regions of the plurality of regions;
determining a second candidate value in the first region;

assigning the second candidate value to the hyperparameter of the computational model; and determining a second performance metric for the computational model based on training data and validation data processed by the computational model with the second candidate value assigned to the hyperparameter.

14. The method of claim 13, further comprising:

comparing the first and second performance metrics; and determining, based on the comparison, a greater one of the first and second performance metrics; and assigning, to the hyperparameter, the candidate value corresponding to the greater one of the first and second performance metrics.

15. The method of claim 13, further comprising:

interpolating the plurality of sampled values to generate a plurality of interpolated values, each interpolated value associated with an estimated performance metric corresponding to the computational model with the interpolated value assigned to the hyperparameter, the interpolation based at least in part on a respective uncertainty of previously sampled hyperparameter values;

determining, based on the interpolation, a first interpolated value of the plurality of interpolated values having the greatest estimated performance metric relative to the remaining plurality of interpolated values;

determining that the first interpolated value as is within a first region of a plurality of regions of the search space, the first region having a greatest average estimated performance metric; and expanding the search space to include an additional region, the additional region comprising a plurality of additional possible values for the hyperparameter.

16. The method of claim 15, further comprising:

assigning a first additional possible value of the plurality of additional possible values in the additional region to the hyperparameter; and an actual performance metric for the computational model based on training data and validation data processed by the computational model with the first additional possible value assigned to the hyperparameter.

17. The method of claim 13, further comprising:

training the computational model using the training data and the first candidate value assigned to the hyperparameter of the computational model; and validating the computational model using the validation data to generate the first performance metric for the computational model with the first candidate value assigned to the hyperparameter.

* * * * *